(12) United States Patent
Hovorka (10) Patent No.: US 6,881,929 B2
(45) Date of Patent: Apr. 19, 2005

(54) PORTABLE HEAT SEALER (75) Inventor: George B. Hovorka, Melrose, MA (US)

(73) Assignee: Idolon Technologies, Melrose, MA (US)

( * ) Notice: Subject to any disclaimer, the term of this patent is extended or adjusted under 35 U.S.C. 154(b) by 12 days.

(21) Appl. No.: 10/421,648

(22) Filed: Apr. 23, 2003

(65) Prior Publication Data

US 2004/0020913 A1 Feb. 5, 2004

Related U.S. Application Data (60) Provisional application No. 60/375,563, filed on Apr. 25, 2002.

(51) Int. Cl.$^7$ ................................................ H05B 3/06
(52) U.S. Cl. ........................................ 219/243; 156/311
(58) Field of Search .......................... 156/64, 311, 358, 156/359, 367, 583.1–583.4, 583.7–583.9, 368; 219/243

(56) References Cited

U.S. PATENT DOCUMENTS

| | | | |
|---|---|---|---|
| 1,869,140 A | | 7/1932 | Gelinas |
| 2,261,221 A | | 11/1941 | Bruner |
| 2,581,977 A | * | 1/1952 | Spalding et al. ............. 219/243 |
| 3,148,269 A | * | 9/1964 | Hartesveldt et al. ........ 219/243 |
| 3,328,136 A | | 6/1967 | Verakas, Jr. |
| 3,334,005 A | * | 8/1967 | Fener ...................... 156/583.2 |
| 3,461,073 A | | 8/1969 | Crowell, Jr. |
| 3,490,981 A | | 1/1970 | Shanklin |
| 3,586,821 A | * | 6/1971 | Buob ......................... 219/243 |
| 3,597,587 A | * | 8/1971 | Baum ......................... 219/243 |
| 3,702,302 A | | 11/1972 | Wilson |
| 3,721,801 A | * | 3/1973 | Bate ........................... 219/243 |
| 3,766,079 A | | 10/1973 | Jackman |
| 3,792,770 A | | 2/1974 | Freeman |
| 3,912,575 A | * | 10/1975 | Zelnick ....................... 219/243 |
| 4,349,727 A | | 9/1982 | Churchill |
| 4,354,095 A | | 10/1982 | de Vries |
| 4,378,266 A | | 3/1983 | Gerken |
| 4,451,325 A | | 5/1984 | Bubenzer |
| 5,034,087 A | | 7/1991 | Denker et al. |
| 5,158,132 A | * | 10/1992 | Guillemot ................ 156/583.1 |
| 5,616,199 A | * | 4/1997 | Jurrius et al. ............... 219/243 |

\* cited by examiner

Primary Examiner—Teresa J. Walberg
(74) Attorney, Agent, or Firm—Pearson & Pearson, LLP (57) ABSTRACT

A portable heat sealer for sealing heavy grade thermoplastic films comprises a plurality of adjacent, segmented heating elements positioned along the underside of a heated sealing bar. The segmented heating elements are under the control of a microprocessor for controlling the energy applied to the heated sealing bar to avoid the formation of hot spots and to obtain a strong seal. Each heating element is maintained in firm contact with the heated sealing bar by means of a tension spring. A thermoplastic film bag is placed on the heated sealing bar and a movable sealer jaw is lowered on top of the bag. A jaw switch is activated by the sealer jaw which turns-on power to the heat sealer. A latch 32 attaches to a clip on the end of the sealer jaws and secures the sealer jaw in place. Pilot lights are provided to indicate to an operator the cycles of "ready", "heat" and "cool".

22 Claims, 5 Drawing Sheets

PORTABLE HEAT SEALER

This is a Nonprovisional patent application claiming priority of Provisional Application for Patent Ser. No. 60/375,563, filed Apr. 25, 2002, and it is incorporated herein by reference.

BACKGROUND OF THE INVENTION

1. Field of the Invention

This invention relates to a heat sealing apparatus for sealing thermoplastic films, and in particular to a portable heat sealer having a plurality of adjacent segmented heating elements, positioned along the underside of a heated sealing bar, which operates under microprocessor control.

2. Description of Related Art

Thermoplastic films are conventionally sealed by heat applied in a number of ways including hot wires, ultrasonically vibrated heads, and radiant energy. Such sealing devices normally utilize opposed jaw members with one of the jaw members being heated and the other jaw member provided with a resilient facing. Generally the heated jaw of the sealer consists of an aluminum bar with an internal heating element which is known in the art as a "sealer bar". After the pouch or other item constructed from thermoplastic films is placed between the jaws, a mechanism is provided which is operator actuatable to clamp the jaws and start the sealing cycle. The period of time the jaws are closed and the amount of heat applied are typically predetermined. An example of this type of sealer is shown in U.S. Pat. No. 4,378,266, issued Mar. 29, 1983 to Carl F. Gerken, which describes a lever used to actuate a jaw and set an electronic timer. However, imperfect seals occur due to non-uniform heating along the heated jaw.

Another type of sealer utilizes a heated wire in place of the sealer bar to bond thermoplastic films. Examples of such devices are taught in U.S. Pat. No. 3,792,770, issued Feb. 19, 1974 to Max Freeman, and U.S. Pat. No. 3,490,981, issued Jan. 20, 1970 to Frank Garrett Shanklin. While relatively inexpensive and relatively rapid in operation such method of sealing is not able to consistently produce strong liquid-tight hermetic seals. In some products, the presence of an imperfection or less than consistently perfect seal may be acceptable, for example, frozen foods packaged in plastic resin film pouches and L-frame seals used for shrink packaging. However, such inferior sealing is not acceptable in other situations where the seal made by a heated wire has relatively little strength and may easily burst from internal pressure.

All such prior art devices, including heated sealer bars and heated wires, have been subject to heating problems in which the thermoplastic films can be either overheated or under heated causing imperfect seals as well as problems of non-uniform heating along the length of the seal due to variations in the pressure and temperature along the heated sealing bar. This problem is particularly acute when a heated sealer bar is used to produce hermetic seals that are long and wide for thick, laminate, thermoplastic films.

The heat sealing of thermoplastic films requires that the material be elevated in temperature to a certain point and held under heat and pressure for a certain length of time in order to bring about an effective seal. If more heat than is necessary is used to cause bonding of the thermoplastic materials, they may scorch, and the use of too little heat may prevent the desired bonding. The former condition usually results in the accumulation of burnt materials on the heated sealing bar which interferes with the functioning of the sealer. In a similar manner, variations in pressure along the jaw member provided with a resilient facing can result in variations in seal quality. In summary, the possibility of overheating portions of the seal, while under heating other areas and variation in the pressure provided by the resilient facing, can cause seal imperfections such as pronounced seal weakness.

Previous attempts to address the issue of uniform heating of the sealer bar have included improvements upon a sheathed type electrical heater which utilizes magnesium oxide insulation as described in U.S. Pat. No. 1,869,140, issued Jul. 26, 1932 to W. F. Gelinas. Another example of this is a rod type heating device consisting of a bent longitudinal element configured in a manner to provide uniform heat in the center of the element as described in U.S. Pat. No. 4,349,727, issued Sep. 14, 1982, to John W. Churchill. Various other configurations of the rod type-heating element have been developed to produce more even heating including rod type heating elements with a triangular cross-section. An example of a triangular tubular heater of the prior art is the Chromalox Model TI, heart-shaped, cross-section heater manufactured by the Chromalox Division of Emerson Electric Company, of Pittsburg, Pa. There is also an example of increasing the wall thickness, weight and thermal conductivity of the heated sealing bar in an attempt to more evenly distribute the heat along its surface as described in U.S. Pat. No. 4,451,325, issued May 29, 1984, to Wilfried Bubenzer.

More recently, the heated sealing bar has been mounted on springs so that the entire heated sealing bar is movable inwardly and outwardly a certain amount to apply a constant pressure. This approach is described in U.S. Pat. No. 5,034,087, issued Jul. 23, 1991 to Stanley D. Denken.

The common deficiencies encountered with the above prior art teachings is that they require a high degree of mechanical complexity to achieve liquid tight, hermetic seals. The primary deficiency of all these devices is that they require heavy rigid construction. Another important deficiency is that they require considerable time to arrive at a sealing temperature due to their large thermal mass. Still another important deficiency is that they are not well suited for the lightweight and low cost design requirements of a portable heat sealer.

The problems with the heat sealers of the prior art are overcome by the heat sealer to be described in the following summary and description.

SUMMARY OF THE INVENTION

Accordingly, it is therefore an object of this invention to provide a portable heat sealer for sealing heavy grade, thermoplastic film bags.

It is another object of this invention to provide segmented heating elements under microprocessor control in a portable heat sealer to avoid the formation of hot spots on a sealing surface area of the heat sealer.

It is a further object of this invention to provide a heated sealing bar assembly in the heat sealer in which a lack of uniform pressure along a movable jaw member is compensated for by a software program running in a microprocessor.

It is another object of this invention to provide consistent high quality seals despite variations in the initial temperature of the sealer bar.

It is yet another object of this invention to provide a light weight, low cost, portable heat sealer.

These and other objects are further accomplished by a heat sealer comprising a fixed sealing bar, means for heating the fixed sealing bar, a movable bar for closing against a surface of the fixed sealing bar, means, attached to the fixed sealing bar for sensing the temperature of the fixed sealing bar, and means, coupled to the heating means, for controlling the heating means in response to a signal from the temperature sensing means and in accordance with a predetermined heating profile. A thermoplastic film is placed between the fixed sealing bar and such movable bar for sealing the thermoplastic film. The movable bar comprises means for rotating a first end of the movable bar to enable opening and closing the movable bar, and means for securing a second end of the movable bar against the fixed sealing bar. The movable bar comprises a resilient facing for contacting the fixed sealing bar and material being sealed between the fixed sealing bar and the movable bar. The heat sealer comprises a switch for generating an initiate cycle signal to the controlling means when the movable bar is closed against the fixed sealing bar. The controlling means coupled to the heating means comprises a programmable microprocessor. The programmable microprocessor comprises a software program having an initialize cycle, a heating cycle and a cooling cycle in accordance with the predetermined heating profile. The heating means comprises an electrical heater. The heating means may also comprise chemically generated heat, and a resilient facing on the movable bar for contacting the fixed sealing bar wherein the resilient facing is divided into segments to enable pressure control of each segment. The means for controlling the chemically generated heating means comprises means for selectively releasing pressure control of each of the resilient facing segments.

The objects are further accomplished by a heat sealer comprising a heated sealing bar, a plurality of segmented heating elements positioned in contact with the heated sealing bar, a movable sealer jaw, attached near an end of the heated sealing bar, for securely closing on the heated sealing bar, a temperature sensor positioned on a predetermined location on the heated sealing bar, and means, coupled to each of the segmented heating elements, for heating the segmented heating elements under computer control in response to a signal from the temperature sensor. A thermoplastic film is placed between the heated sealing bar and the movable sealing bar for sealing the thermoplastic film. The plurality of segmented heating elements comprises means for firmly holding the segmented heating elements in contact with the heated sealing bar. The means for firmly holding the segmented heating elements in contact with the heated sealing bar comprises a tension spring attached to each of the segmented heating elements. The movable sealer jaw comprises means positioned at a first end for opening and closing the movable sealer jaw, and means positioned at a second end of the movable sealer jaw for securely closing the movable sealer jaw. The movable sealer jaw comprises a resilient facing for contacting material being sealed. The movable sealer jaw when closed contacts a switch which initiates a sealing cycle. The means for heating the segmented heating elements under computer control comprises a programmable microprocessor in accordance with a predetermined heating profile. The programmable microprocessor comprises a software program having an initialize cycle, a heating cycle and a cooling cycle in accordance with the predetermined heating profile.

The objects are further accomplished by a method of heat sealing a thermoplastic film comprising the steps of providing a heated sealing bar, the sealing bar having a plurality of segmented heating elements positioned along the heated sealing bar, sensing the temperature of the heated sealing bar at a predetermined location, heating the segmented heating elements under computer control in response to an initial heating cycle signal and the sensed temperature of the heated sealing bar, placing a thermoplastic film to be sealed on the heated sealing bar, closing a movable sealer jaw to compress the thermoplastic film against the heated sealing bar, and initiating a sealing cycle in response to the initiate heating cycle signal generated by closing the movable sealer jaw. The step of providing a heated sealing bar having a plurality of segmented heating elements along the heated sealing bar comprises the step of providing means for firmly holding the segmented heating elements in contact with the heated sealing bar. The step of sensing the temperature of the heated sealing bar comprises the step of placing a thermistor at approximately a center point along the length of the heated sealing bar. The step of closing a movable sealer jaw comprises the step of actuating a switch to generate the initiate heating cycle signal. The step of heating the segmented heating elements under computer control comprises the step of providing a software program having an initialize cycle, a heating cycle and a cooling cycle in accordance with a predetermined heating profile.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
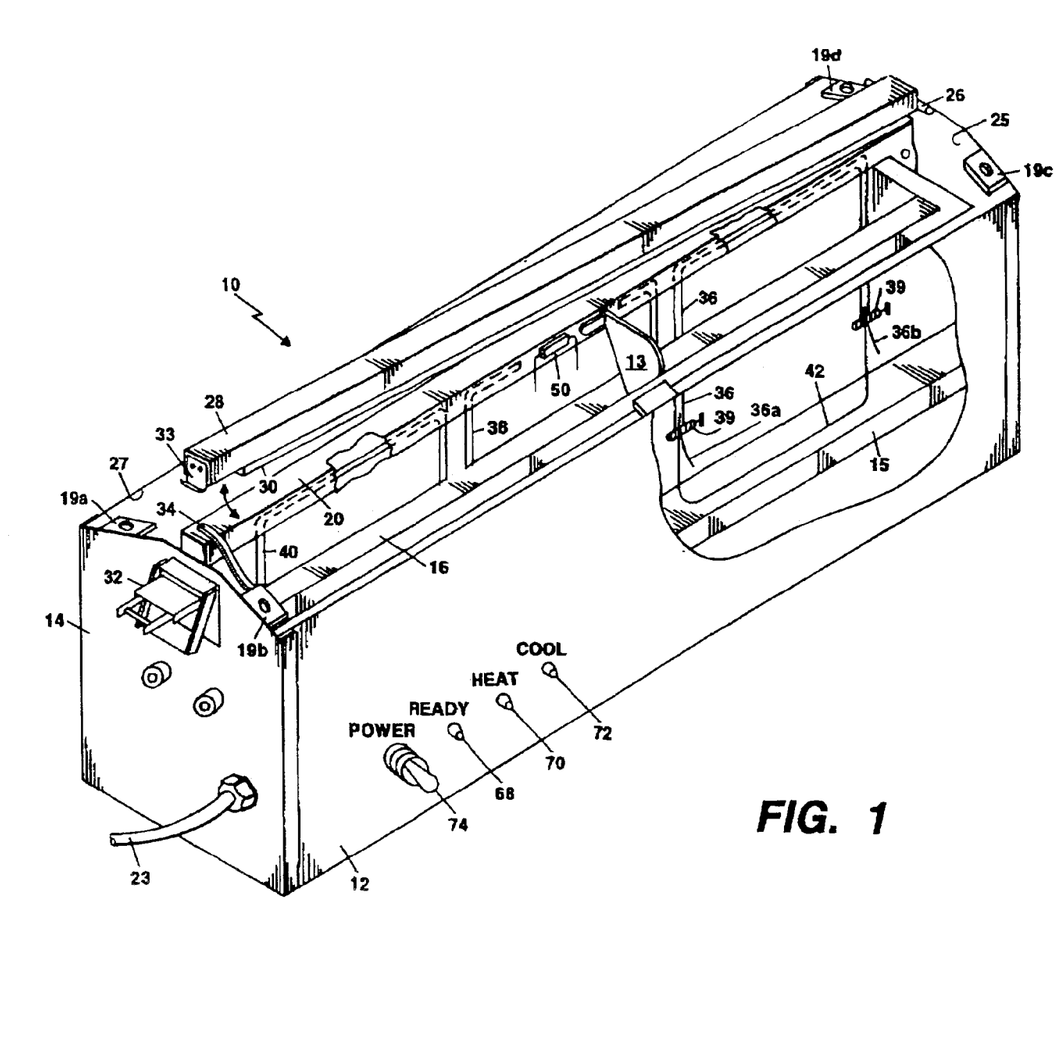
FIG. 1 is a perspective view of a portable heat sealer according to the invention showing a movable sealer jaw in a raised position and a cutaway of a side panel exposing a tension wire attached to a segmented heating element positioned within a heated sealing bar.

Referring to FIG. 1, a perspective view of a portable heat sealer 10 according to the invention is shown which is easily picked up and moved to different operating locations by an operator. An enclosure 11 for the heat sealer 10 comprises side panels 12, 27 and end panels 14, 25, a bottom panel (not shown) and two top panels (not shown). The top panels extend from end to end and mount on each side of a heated sealing bar 20. The top panels when attached to the enclosure 11 rest on tabs 19*a*, 19*b*, 19*c* and 19*d*, and the top panels are secured to each of the tabs 19*a*–19*d* by screws.

Figure 2:
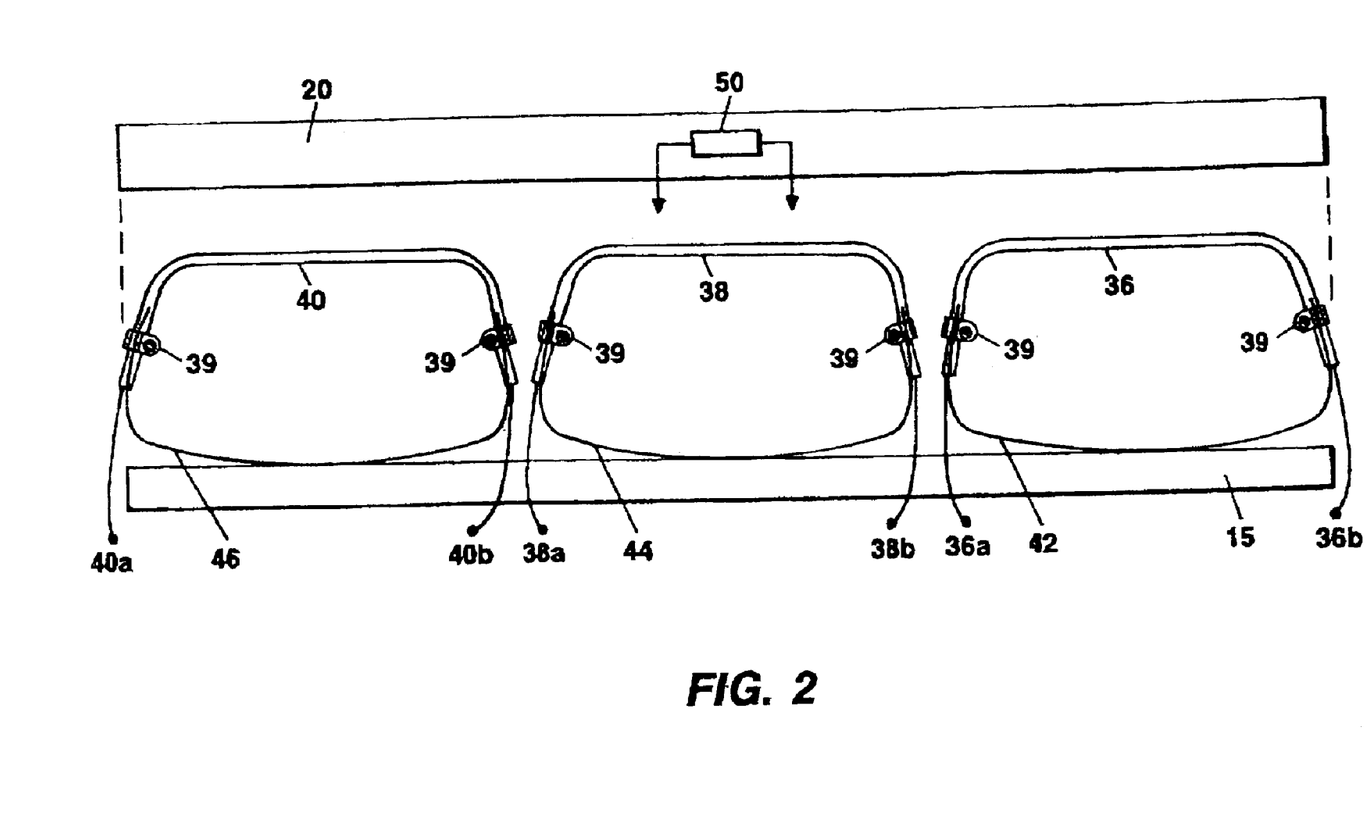
FIG. 2 is a side elevational view of three adjacent segmented heating elements attached to tension springs which provide for the segmented heating elements to make firm contact within a heated sealing bar.

Referring to FIG. 1 and FIG. 2, FIG. 2 is a side elevational view of three adjacent segmented heating elements 36, 38, 40 for providing heat to the heated sealing bar 20 within the portable heat sealer 10. The segmented heating elements 36, 38, 40 are mounted underneath the heated sealing bar 20 and in a line adjacent to each other. Tension springs 42, 44, 46 are attached to each of the heating elements 42, 44, 46 respectively as shown in FIG. 1 and FIG. 2. The tension springs 42, 44, 46 provide force to keep the segmented heating elements 36, 38, 40 in firm contact with the underside of the heated sealing bar 20. The tension springs 42, 44, 46 are attached to the segmented heaters 36, 38, 40 by clamps 39. The segmented heating elements 36, 38, 40 are light weight, round cross-section, tubular heaters with a preferred diameter of 0.25 inches and watt density of 55 watts per linear inch. Control lines 36a, 36b, 38a, 38b, 40a and 40b extend from each end of the heating elements 36, 38, 40 to control their operation. The heated sealing bar 20 may be embodied by any material that provides good thermal conduction such as cold rolled steel, although it is preferred that a minimum thermal mass be used in order to minimize cooling time.

A movable sealer jaw 28 is positioned along the top of the heated sealing bar 20 with one end attached by a hinge 26 to the end panel 14 of enclosure 11. FIG. 1 shows the heated sealing bar 20 in a raised position. A resilient facing 30 is attached to the underside of the movable sealer jaw 28 for contacting the heated sealing bar 20 and in particular any item such as a thermoplastic film in the form of a pouch or a bag (not shown) inserted between the movable sealer jaw 28 and the heated sealer bar 20 for sealing. The resilient facing 30 may be embodied by a high temperature, low density foam rubber such as type C55N53/41/4 manufactured by Rempac Foam Corp. of Clifton, N.J.

The movable sealer jaw 28 is clamped in a closed position by a latch 32 mounted on end panel 14 and clip 33 attached to the end of the movable sealer jaw 28. A jaw switch 34 is provided at the latch end of the portable heat sealer 10 having an actuating lever positioned between the heated sealer bar 20 and the movable sealer jaw 28, such that when the movable sealer jaw 28 is closed against a thermoplastic film, the jaw switch 34 is activated sending a signal to the control module 22 for initiating a heat sealing cycle.

Still referring to FIG. 1, a thermistor 50 is mechanically attached approximately to the center of the heated sealing bar 20. The thermistor 50 is a temperature responsive element. The thermistor 50 senses the temperature of the heated sealing bar 20 and provides a control signal to a microprocessor 60 mounted within a control module 22. The control module 22 provides the required DC voltages and controls the operation of the portable heat sealer 10, and in particular, controls the operation of each one of the segmented heating elements 36, 38, 40.

Figure 3:
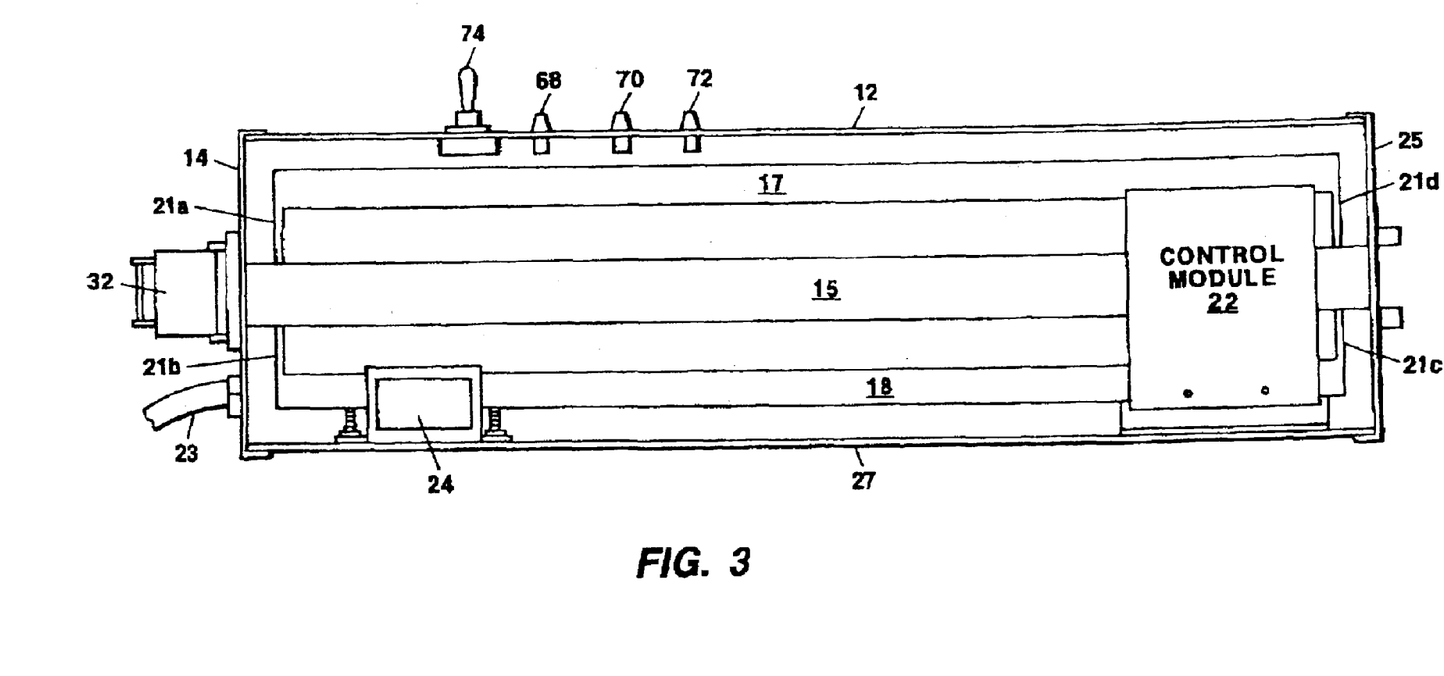
FIG. 3 is a bottom view of the portable heat sealer showing a center frame and a control module.
Figure 4:
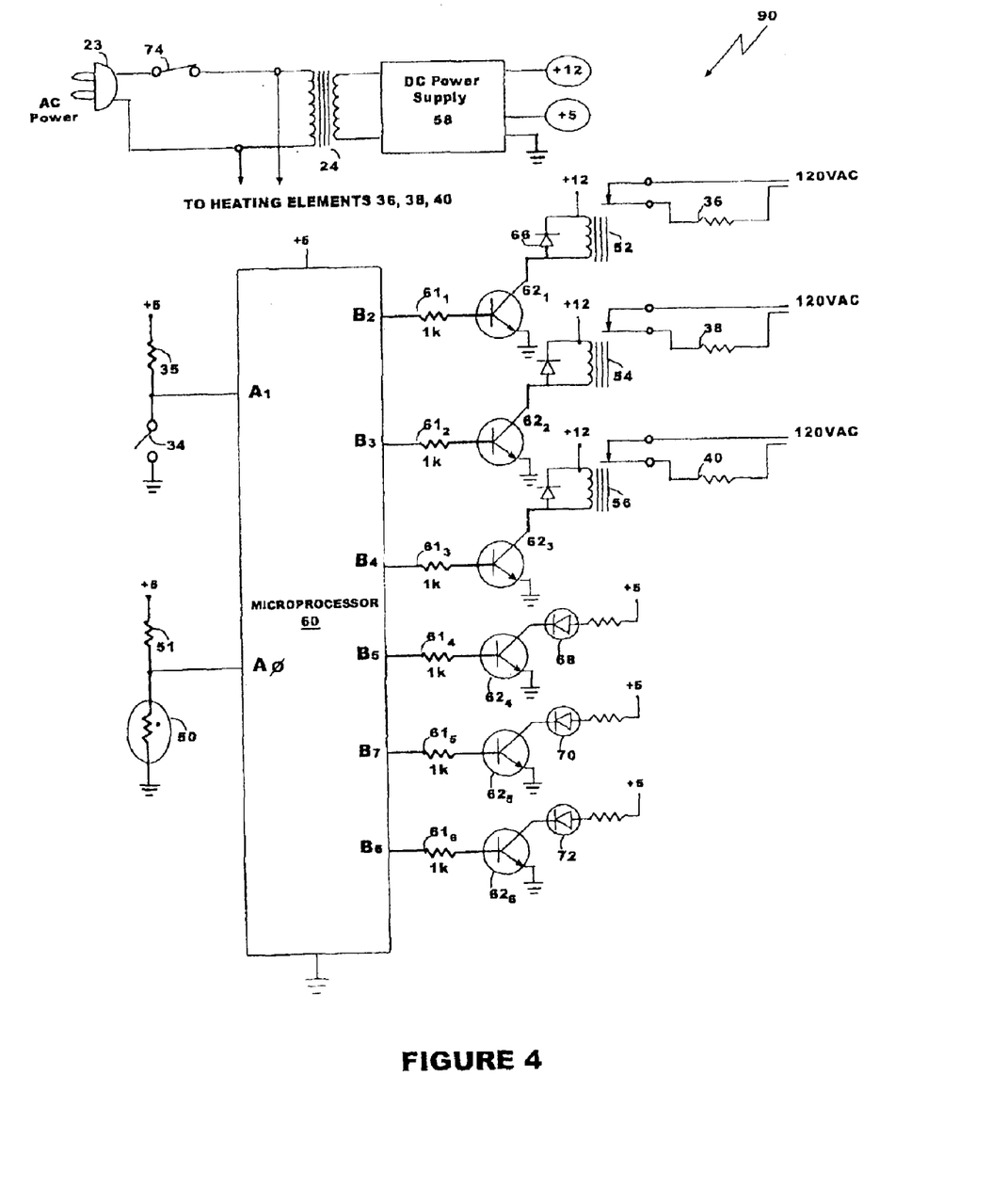
FIG. 4 is a partial schematic/block diagram of the power sources and control circuits under microprocessor control of the portable heat sealer.

Referring to FIG. 3, a bottom view of the portable heat sealer 10 is shown. A center frame 15 extends from one end panel 14 of the heat sealer 10 to the opposite end panel 25, and the center frame 15 comprises frame bars 17, 18 that run parallel with center frame 15. The ends of frame bars 17, 18 attach to brackets 21a–21d that attach to the ends of the center frame 15. A 120 VAC power cord 23 is attached to end panel 14. The power cord 23 is fed to switch 74 and then to the primary of an input transformer 24. The secondary of transformer 24 is coupled to an AC to DC converter in control module 22 to generate +12V and +5V for powering the electronic control circuits 90 (FIG. 4). The side panel 14 comprises pilot lights 68, 70, 72 which indicate operating modes or cycles such as "ready" 68, "heat" 70, and "cool" 72 respectively. The end panel 14 comprises the latch 32 for securing the movable sealer jaw 28 against the heated sealing bar 20. The control module 22 is attached to the side panel 12 and comprises the control electronics for the heat sealer 10.

Referring now to FIG. 4, a partial schematic/block diagram of the power sources and control circuits 90 under microprocessor 60 control located in the control module 22 are shown. The control circuits 90 are used to control the heating of each of the segmented elements 36, 38, 40 which provide the heat to the heated sealing bar 20. The 120 VAC power is applied by main power switch 74 to transformer 24 which provides a lower AC voltage to a DC power supply 58. The DC power supply 58 generates +12 volts and +5 volts for operating the control circuits 90.

Still referring to FIG. 4, a programmable microprocessor 60 provides for software program control of the portable heat sealer 10. The microprocessor 60 receives temperature information from the thermistor 50 and receives a start signal for a sealer cycle from a jaw switch 34 which is activated when the movable sealer jaw 28 is closed against a thermoplastic film bag being placed on the heated sealing bar 20. The microprocessor 60 provides output signals at ports B2 to B4 to control the base of each transistor $62_1$, $62_2$, $62_3$ respectively.

The output current from said output signal ports B2 to B4 is current limited with resistors $61_1$, $61_2$, $61_3$. The value of resistors $61_1$, $61_2$, $61_3$ is preferably 1K ohms. Each heating element 36, 38, 40 is connected to one of the control relays 52, 54, 56 respectively. Each control relay 52, 54, 56 has a flyback diode 66 to suppress voltage transients which could otherwise damage the microprocessor 60.

In addition to controlling the relays 52, 54, 56, the microprocessor 60 also controls the three pilot lights "ready" 68, "heat" 70 and "cool" 72. Each of the pilot lights 68, 70, 72 indicates to an operator of the portable heat sealer 10 where in the sealer cycles the heat sealer 10 is actually operating. Each of the pilot lights 68, 70, 72 is switched by a transistor $64_4$–$61_6$ in response to an "ON" and "OFF" signal from the microprocessor 60.

The microprocessor 60 may be embodied by Model PIC 16C711, 8 bit microcontroller, with 1K bytes of internal ROM memory storage, manufactured by Microchip Technology, Inc. of Chandler, Ariz. The switching transistor $62_1$–$62_6$ is a commonly available 2N3904. The control relays may be embodied by Model G2R-1S-ASI-DC12 manufactured by Omron Electronics LLC of Schaumburg, Ill. The thermistor may be embodied by Type 2322-633-83303, having a resistance of 30K at 25 degrees centigrade, manufactured by BC Components of Rosemont, Ill.

Figure 5:
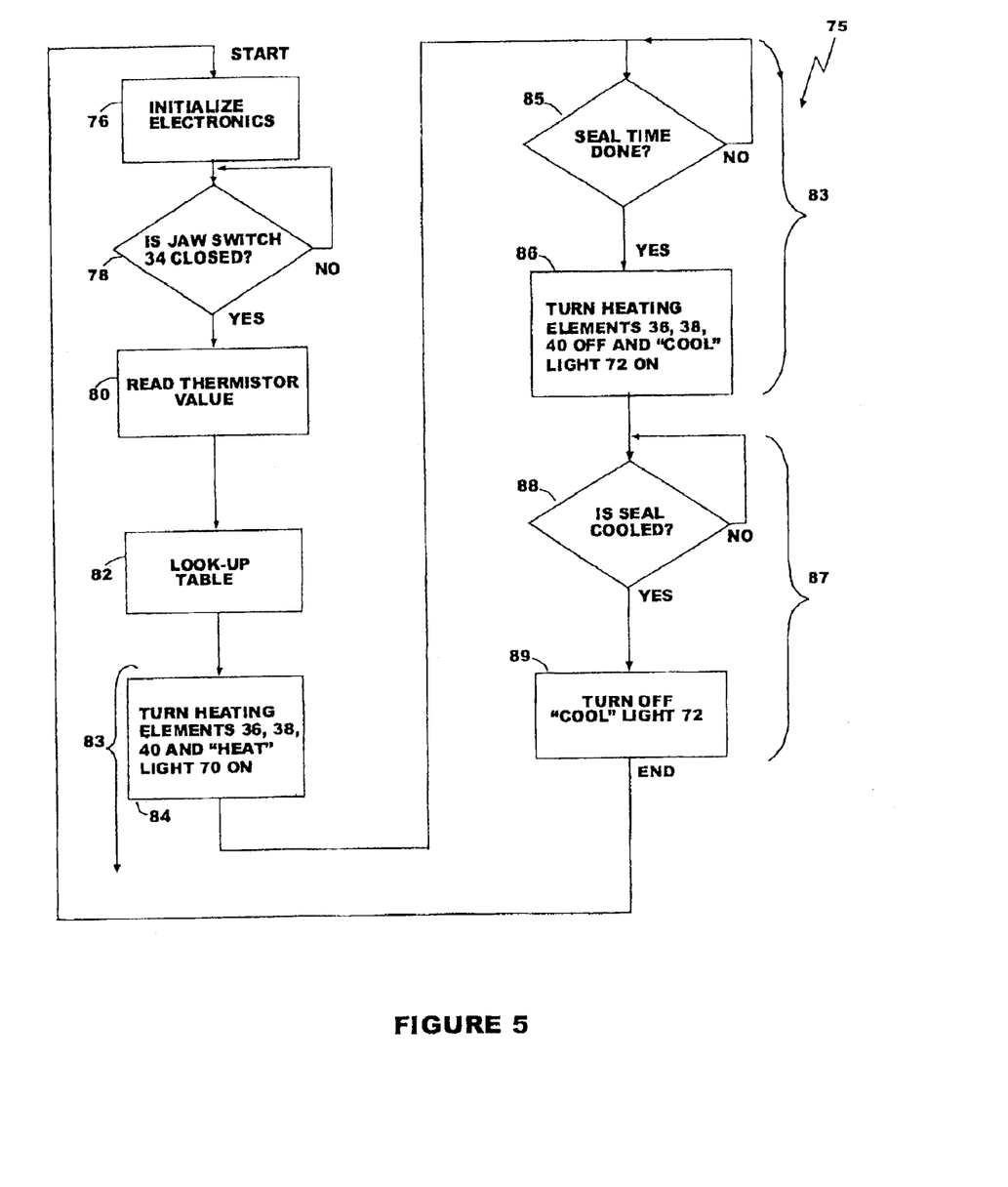
FIG. 5 is a flow chart of a software program for the microprocessor to control the operation of the portable heat sealer.

Referring to FIG. 5, a flow chart 75 is shown for the software program in the microprocessor 60 used to control the operation of the portable heat sealer 10. A computer program listing of the source language for this software program is provided at the end of the description. In step 76 an operator initiates a sealing cycle by turning on the main power switch 74 which initializes the microprocessor 60 and associated electronic control circuits 90. The microprocessor 60 provides signals at ports B2, B3 and B4 to turn-off the segmented heating elements 36, 38, 40, and also provides a signal from port B5 to turn-on the "ready" pilot light 68. Next in step 78, the program checks to determine if the jaw switch 78 is activated which occurs when the movable sealer jaw 28 is closed on the thermoplastic film in the form of a pouch or a bag placed over the heated sealing bar 20. The resilient facing 30 on the movable sealer jaw 28 is in compression contact with the thermoplastic film. The latch 32 engages the clip 33 on the end of the movable sealer jaw 28 securing the movable sealer jaw 28 which causes the jaw switch 34 to be activated, and the jaw switch 34 sends a turn-on signal to the microprocessor 60 at port A1 which is sensed by step 78. Microprocessor 60 port A1 is pulled to +5 volts with resistor 35 which is preferably 1K ohms. Step 78 is repeated if the jaw switch 78 is not activated; otherwise, the program proceeds to step 80 to read the input signal from the thermistor 50.

In step 82, the value received from the thermistor 50 indicates the initial temperature value of the heated sealing bar 20. Thermistor 50 is biased into conduction with resistor 51 which is preferably 10K ohms. An analog to digital converter algorithm, which is included in the microprocessor 60, converts the analog signal from the thermistor 50 to a digital word that addresses a look-up table. This table determines how long each of the segmented heating elements 36, 38, 40 should be turned-on to create a uniform seal according to the current temperature of the heated sealing bar 20. For example, it was experimentally determined that when the sealing bar 20 was at room temperature, the analog to digital converter algorithm measured 185 counts, and the best seal was formed when heating element 40 was turned on for 35 seconds, heating element 36 was turned on for 37 seconds and heating element 38 was turned on for 27 seconds. When the heated sealing bar 20 was not fully cooled to room temperature, the analog to digital converter algorithm measured 84 counts, and the best seal was formed when heating elements 40 and 36 were turned on for 31 seconds and heating element 38 was turned on for 22 seconds. These values and other values taken for other sealing bar temperatures are stored in the look-up table 82. The timing information compensates for variations in the movable sealer jaw 28 pressure across the thermosplastic film resting on the heated sealing bar 20 and for varying thermal loss across the heated sealing bar 20. For example, the movable sealing jaw 28 typically provides more pressure at the hinge 26 and at latch 32 ends of the jaw 28, requiring less heating time for heating element 36 and heating element 40 controlled by ports B2 and B4 of the microprocessor 60 in order to provide a uniform seal.

Once the timing cycle has been determined in step 82 for relays 52, 54, 56, these variables are passed to a seal timing loop 83. In step 84 the relays 52, 54, 56 are activated for various lengths of preset time thereby energizing the heating elements 36, 38, 40; further in step 84 the "ready" pilot light 68 is turned off, and the "heat" pilot light 70 is turned on. In step 85 the seal time is monitored, and when completed, the program proceeds to step 86 and turns off the relays 52, 54, 56 and the "heat" pilot light 70.

Next, the sealer temperature monitoring loop 87 is entered. In step 88 the temperature of the heated sealing bar 20 is monitored to determine when the thermoplastic film has been bonded and is cooled. When the bonded area is cooled, the program proceeds to step 89 and the "cool" pilot light 72 is turned off. At this point the program returns back to step 76 to wait for the next jaw switch 34 activation.

It can be seen that the illustrative embodiment employs a series of sheath type electrical heaters and at least one thermistor type temperature sensing device. It is within the inventive concepts herein disclosed to employ other types of heat generating and temperature sensing means. Examples of alternate heat generating means include the etched foil heaters used to heat seal thermoplastic films shown in U.S. Pat. No. 4,055,456, issued Oct. 25, 1977 to Frank Carnegie and U.S. Pat. No. 3,617,696, issued Nov. 2, 1971 to John E. Reenstra.

For battery operated portable heat sealers it may be desirable to eliminate the use of large batteries to provide the energy to operate electrical heaters and rather, generate the heat chemically. The result is a smaller, lighter unit with significantly decreased operating expense. Exothermic chemical reactions have been used to cure plastic resin adhesives in the temperature region needed to bond thermoplastic films. Examples of such compositions are described in U.S. Pat. No. 3,550,578, issued Dec. 29, 1970 to Robert Earl Fearson and U.S. Pat. No. 3,766,079, issued Oct. 16, 1973 to Robert M. Jackman. Generally, the exothermic compositions of these inventions are comprised of an alkaline oxide reactant and an acidic reactant. When these compounds are mixed in the presence of water, exothermic heat is liberated which can be used to bond thermoplastic films. The disadvantage of the exothermic heating means is that the heat can not be rapidly switched off like an electrical heater. Therefore the aforementioned relationship between heat, pressure and time can be used to make a heat seal in which segmented sealing pressure is used to control the seal quality rather than segmented heaters. In order to use such exothermic heating means in the present invention, the segmented heating elements 36, 38 and 40 are replaced with a single exothermic heater which is held in firm contact with the underside of the heated sealing bar 20 by tension springs 42, 44 and 46. The resilient facing 30 is now broken into three segments with the sealing pressure of each segment selectively controlled by a rotary solenoid. The rotary solenoid may be embodied by a Model H-1352-025 manufactured by Ledex of Solon, Ohio. The operation of the control circuits and software program are the same as the preferred embodiment except control relays 52, 54 and 56 are replaced with said rotary solenoids, and the pressure is selectively released from the film when the seal is completed rather than turning off the heater segments. Other thermal sensors to provide the appropriate feedback to the microprocessor 60 such as thermocouples and resistive thermal detectors (RTD) are also known to those skilled in the art. The sensing of heat seals with these detectors is taught in U.S. Pat. No. 5,666, 790 issued Sep. 16, 1997 to Douglas D. Dreger. Other temperature sensing methods include those in which there is no direct contact with the sealing platen. An example of this method is taught in Japanese Publication 2000095316A published on Apr. 4, 2000 and invented by Suga Yasutaka.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

COMPUTER PROGRAM LISTING

Source Language

```
#include <16C711.H>
#fuses HS, NOWDT, NOPROTECT
#use delay(clock=8000000)
/* funtional prototypes */
    void main( );
    void sealer_cycle( );
    void switch_test( );
    void cooling_time( );
/* global varables */
int heater_1_seal_time = 15;
int heater_2_seal_time = 15;
```

```
-continued int heater_3_seal_time = 15;
int end_value = 100; /
main( ) {
int value1;
while(1)
    {
    setup_port_a(ALL_ANALOG);
        setup_adc( ADC_CLOCK_INTERNAL );
output_low(PIN_B2);
    output_low(PIN_B3);
        output_low(PIN_B4);
            output_high(PIN_B5);
                output_low(PIN_B7);
                    output_low(PIN_B6);
switch_test( );
set_adc_channel( 0 );
    value1 = Read_ADC( );
        if (value1 >= 30)
        {
            heater_1_seal_time = 5;
            heater_2_seal_time = 18;
            heater_3_seal_time = 0;
        end_value = 30;
}
        if (value1 >= 40)
        {
            heater_1_seal_time = 5;
            heater_2_seal_time = 19;
            heater_3_seal_time = 0;
        end_value = 38;
}
        if (value1 >= 60)
        {
            heater_1_seal_time = 6;
            heater_2_seal_time = 20;
            heater_3_seal_time = 0;
        end_value = 57;
}
        if (value1 >= 80)
        {
            heater_1_seal_time = 7;
            heater_2_seal_time = 20;
            heater_3_seal_time = 0;
        end_value = 65;
}
        if (value1 >= 100)
        {
            heater_1_seal_time = 9;
            heater_2_seal_time = 22;
            heater_3_seal_time = 0;
end_value = 90;
}
        if (value1 >= 120)
        {
            heater_1_seal_time = 5;
            heater_2_seal_time = 22;
            heater_3_seal_time = 3;
end_value = 110;
}
        if (value1 >= 140)
        {
            heater_1_seal_time = 3;
            heater_2_seal_time = 25;
            heater_3_seal_time = 7;
end_value = 120;
}
        if (value1 >= 170)
        {
            heater_1_seal_time = 3;
            heater_2_seal_time = 26;
            heater_3_seal_time = 7;
end_value = 150;
}
        if (value1 >= 200)
        {
            heater_1_seal_time = 3;
            heater_2_seal_time = 27;
            heater_3_seal_time = 8;
end_value = 170;
```

```
-continued

}
        if (value1 >= 220)
        {
            heater_1_seal_time = 5;
            heater_2_seal_time = 29;
            heater_3_seal_time = 10;
    end_value = 180;
}
    output_low(PIN_B5);
        output_high(PIN_B7);
            output_high(PIN_B2);
                output_high(PIN_B3);
                    output_high(PIN_B4);
sealer_cycle( );
    output_low(PIN_B7);
        output_high(PIN_B6);
    cooling_time( );
            output_low(PIN_B7);
                }
        }
sealer_cycle( )
{
int data = 0;
        for(data=0; data <= heater_2_seal_time; data++)
        {
            delay_ms(1000);
        }
        for(data=0; data <= heater_3_seal_time; data++)
        {
            delay_ms(1000);
        }for(data=0; data <= heater_1_seal_time; data++)
        {
            delay_ms(1000);
        }
        output_low(PIN_B3);
            output_low(PIN_B2);
                output_low(PIN_B4);
}
switch_test( )
    {
            int value1;
        while(1)
        {
            set_adc_channel( 1 );
            value1 = Read_ADC( );
if(value1==0)
return;
    set_adc_channel( 0 );
        value1 = Read_ADC( );
        }
    }
cooling_time( )
{
int value1;
    while(1)
    {
        set_adc_channel( 0 );
            value1 = Read_ADC( );
            if(value1 <= end_value)
                return;
        }
}
```

What is claimed is:

1. A heat sealer comprising:
   a fixed sealing bar;
   means for heating said fixed sealing bar, said heating means comprises a plurality of segmented heating elements positioned in a linear line adjacent to each other;
   a movable bar hinged at a first end for closing against a surface of said fixed sealing bar;
   means, attached to said fixed sealing bar for sensing the temperature of said fixed sealing bar; and
   means, coupled to said heating means, for controlling said heating means in response to a signal from said temperature sensing means and in accordance with a predetermined heating profile.

2. The heat sealer as recited in claim 1 wherein a thermoplastic film is placed between said fixed sealing bar and such movable bar for sealing said thermoplastic film.

3. The heat sealer as recited in claim 1 wherein said movable bar comprises:

hinge means for rotating a first end of said movable bar to enable opening and closing said movable bar; and means for securing a second end of said movable bar against said fixed sealing bar.

4. The heat sealer as recited in claim 1 wherein said movable bar comprises a resilient facing for contacting said fixed sealing bar and material being sealed between said fixed sealing bar and said movable bar.

5. The heat sealer as recited in claim 1 wherein said heat sealer comprises a switch for generating an initiate cycle signal to said controlling means when said movable bar is closed against said fixed sealing bar.

6. The heat sealer as recited in claim 1 wherein said controlling means coupled to said heating means comprises a programmable microprocessor.

7. The heat sealer as recited in claim 6 wherein said programmable microprocessor comprises a software program having an initialize cycle, a heating cycle and a cooling cycle in accordance with said predetermined heating profile.

8. The heat sealer as recited in claim 1 wherein said heating means comprises an electrical heater.

9. A heat sealer comprising:

a heated sealing bar;

a plurality of segmented heating elements positioned in a linear line adjacent to each other in contact with said heated sealing bar;

a movable sealer jaw, attached near an end of said heated sealing bar, for securely closing on said heated sealing bar;

a temperature sensor positioned on a predetermined location on said heated sealing bar; and means, coupled to each of said segmented heating elements, for heating said segmented heating elements under computer control in response to a signal from said temperature sensor.

10. The heat sealer as recited in claim 9 wherein a thermoplastic film is placed between said heated sealing bar and said movable sealing bar for sealing said thermoplastic film.

11. The heat sealer as recited in claim 9 wherein said plurality of segmented heating elements comprises means for firmly holding said segmented heating elements in contact with said heated sealing bar.

12. The heat sealer as recited in claim 11 wherein said means for firmly holding said segmented heating elements in contact with said heated sealing bar comprises a tension spring attached to each of said segmented heating elements.

13. The heat sealer as recited in claim 9 wherein said movable sealer jaw comprises:

means positioned at a first end for opening and closing said movable sealer jaw; and means positioned at a second end of said movable sealer jaw for securely closing said movable sealer jaw.

14. The heat sealer as recited in claim 9 wherein said movable sealer jaw comprises a resilient facing for contacting material being sealed.

15. The heat sealer as recited in claim 9 wherein said movable sealer jaw when closed contacts a switch which initiates a sealing cycle.

16. The heat sealer as recited in claim 9 wherein said means for heating said segmented heating elements under computer control comprises a programmable microprocessor in accordance with a predetermined heating profile.

17. The heat sealer as recited in claim 16 wherein said programmable microprocessor comprises a software program having an initialize cycle, a heating cycle and a cooling cycle in accordance with said predetermined heating profile.

18. A method of heat sealing a thermoplastic film comprises the steps of:

providing a heated sealing bar, said sealing bar having a plurality of segmented heating elements positioned in a linear line adjacent to each other along said heated sealing bar;

sensing the temperature of said heated sealing bar at a predetermined location;

heating said segmented heating elements under computer control in response to an initial heating cycle signal and said sensed temperature of said heated sealing bar;

placing a thermoplastic film to be sealed on said heated sealing bar;

closing a movable sealer jaw to compress said thermoplastic film against said heated sealing bar; and initiating a sealing cycle in response to said initial heating cycle signal generated by closing said movable sealer jaw.

19. The method as recited in claim 18 wherein said step of providing a heated sealing bar having a plurality of segmented heating elements positioned in a linear line adjacent to each other along said heated sealing bar comprises the step of providing means for firmly holding said segmented heating elements in contact with said heated sealing bar.

20. The method as recited in claim 18 wherein said step of sensing the temperature of said heated sealing bar comprises the step of placing a thermistor at approximately a center point along the length of said heated sealing bar.

21. The method as recited in claim 18 wherein said step of closing a movable sealer jaw comprises the step of actuating a switch to generate said initiate heating cycle signal.

22. The method as recited in claim 18 wherein said step of heating said segmented heating elements under computer control comprises the step of providing a software program having an initialize cycle, a heating cycle and a cooling cycle in accordance with a predetermined heating profile.

* * * * *